United States Patent [19]
Johnson

[11] Patent Number: 5,079,916
[45] Date of Patent: Jan. 14, 1992

[54] COUNTER ROTATION POWER TURBINE

[75] Inventor: Kenneth O. Johnson, Cincinnati, Ohio

[73] Assignee: General Electric Company, Cincinnati, Ohio

[21] Appl. No.: 71,594

[22] Filed: Jul. 10, 1987

Related U.S. Application Data

[63] Continuation of Ser. No. 728,466, May 1, 1985, abandoned, which is a continuation-in-part of Ser. No. 437,923, Nov. 1, 1982, abandoned.

[51] Int. Cl.$^5$ .............................................. F02K 11/00
[52] U.S. Cl. ..................................... 60/268; 60/39.162; 416/129
[58] Field of Search ............... 60/226.1, 263, 39.162, 60/39.163, 268; 416/128, 129, 130

[56] References Cited

U.S. PATENT DOCUMENTS

| | | | |
|---|---|---|---|
| 2,360,130 | 10/1944 | Heppner . | |
| 2,404,767 | 7/1946 | Heppner . | |
| 2,478,206 | 8/1949 | Redding . | |
| 2,505,660 | 4/1950 | Baumann | 60/39.161 |
| 2,533,346 | 12/1950 | Brady et al. | 416/130 X |
| 2,613,249 | 10/1952 | Price | 60/39.29 |
| 2,702,985 | 3/1955 | Howell . | |
| 3,153,907 | 10/1964 | Griffith . | |
| 3,363,419 | 1/1968 | Wilde | 60/39.162 |
| 3,462,953 | 8/1969 | Wilde et al. | 60/226.1 |
| 3,467,198 | 9/1969 | Ellinger | 416/2 |
| 3,811,791 | 5/1974 | Cotton | 416/129 |
| 4,159,624 | 7/1979 | Gruner . | |
| 4,171,183 | 10/1979 | Cornell et al. | 416/94 |
| 4,486,146 | 12/1984 | Campion | 416/129 |
| 4,563,129 | 1/1986 | Pagluica | 416/129 |

FOREIGN PATENT DOCUMENTS

| | | |
|---|---|---|
| 586560 | 3/1947 | United Kingdom . |
| 620721 | 3/1949 | United Kingdom . |
| 765915 | 1/1957 | United Kingdom . |
| 774502 | 5/1957 | United Kingdom . |
| 1069033 | 5/1967 | United Kingdom . |
| 1079264 | 8/1967 | United Kingdom . |
| 1079264 | 8/1967 | United Kingdom . |
| 1196094 | 6/1970 | United Kingdom . |

OTHER PUBLICATIONS

"Chapter XV-Thrust Augmentation" to Jet Propulsion Turbojets by V. C. Finch, Dec. 1948.

Primary Examiner—Donald E. Stout
Attorney, Agent, or Firm—Francis L. Conte; Derek P. Lawrence; Nathan D. Herkamp

[57] ABSTRACT

A new and improved gas turbine engine including a gas generator and a power turbine is disclosed. The power turbine includes a first rotor having a plurality of first turbine blade rows extending radially outwardly therefrom, and a second rotor having a plurality of second turbine blade rows extending radially inwardly therefrom. The power turbine is supported aft of the gas generator and is effective for receiving combustion gases therefrom and expanding the gases through the first and second turbine blade rows for extracting substantially all output power therefrom for driving the first and second rotors in counterrotating directions.

25 Claims, 5 Drawing Sheets

COUNTER ROTATION POWER TURBINE

FIELD OF THE INVENTION

This is a continuation of application Ser. No. 728,466, filed May 1, 1985, now abandoned, which is a continuation-in-part of application Ser. No. 437,923, filed Nov. 1, 1982, now abandoned.

This invention relates to gas turbine engines and, more particularly, to a new and improved gas turbine engine including means for efficiently transferring the energy of combustion gases into a net engine thrust.

BACKGROUND OF THE INVENTION

While not limited thereto the present invention is particularly applicable to gas turbine engines such as used for the propulsion of aircraft.

Several types of gas turbine engines are currently available for powering aircraft. The turbofan and the turboprop are two examples of such engines. The turbofan engine includes a core engine, i.e., gas generator, for generating combustion gases which are expanded through a power turbine to drive a fan, whereas the turboprop engine includes a gas generator and power turbine which drives a propeller.

Conventional turboprop engines differ from turbofan engines in several fundamental respects. For example, turboprop engines typically have a much greater blade diameter than turbofan engines. This allows the blades to move a relatively large mass of air for producing thrust. Furthermore, for a given energy input to the blades, a relatively small velocity increase will be imparted to the air passing therethrough. Small velocity increases translate to high engine propulsive efficiencies. Simply stated, propulsive efficiency is a measure of how much available energy is converted to propulsive force. Large velocity increases to air passing through propulsor blades result in "wasted" kinetic energy and lower propulsive efficiency.

Turbofan engines move a somewhat smaller mass of air than do turboprops for the same energy input and impart a larger velocity component to the air in order to achieve the required thrust. This results in a lower propulsive efficiency. Turbofan engines also include a nacelle radially surrounding the fans. This creates an additional drag on the engine which degrades overall engine efficiency. However, the nacelle defines an inlet which diffuses the airstream entering the fan thereby slowing its speed. In this manner, air enters the fan with a relatively low axial velocity which is generally independent of flight speed. Such low axial velocities decrease blade drag losses thereby making higher cruise speeds attainable.

Intermediate-sized transport aircraft, for example, 100 to 180 passenger transports, typically utilize turbofan engines for propulsion. Turbofans provide the relatively high thrust required for powering these aircraft at relatively high altitudes and at cruise speeds of about Mach 0.6 to about Mach 0.8. For aircraft designed for lower cruise speeds, conventional turboprops are typically used inasmuch as they can provide superior performance and efficiency. For example, significant reductions in fuel burn, i.e., the amount of fuel consumed per passenger mile, are possible from the use of the aerodynamically more efficient turboprop over the turbofan.

Accordingly, it would be desirable to combine the advantages of the turbofan and the turboprop for obtaining a compound engine having improved *overall engine* efficiency at aircraft cruise speeds typical of turbofan powered aircraft.

The overall efficiency of an aircraft gas turbine engine is the product of thermal efficiency, transfer efficiency, and propulsive efficiency. Thermal efficiency is related to the core engine and is a measure of how effectively the energy in the fuel is converted to available energy in the core engine exhaust gases. Transfer efficiency is related to the structural engine components excluding the core engine and is a measure of how effectively core engine exhaust gas energy is converted into kinetic energy imparted to the air stream. Engine components which impact transfer efficiency include the propulsor blades, gearbox, power turbine, and engine nacelle. Accordingly, it is desirable to obtain a compound engine having relatively high transfer and propulsive efficiencies at relatively high subsonic Mach numbers.

A simple scaled up version of a conventional turboprop engine suitable for powering an intermediate-sized transport aircraft at the cruise speeds and altitudes typical of turbofan powered aircraft would require a single propeller of about 16 feet in diameter. It would also require the capability of generating about 15,000 shaft horsepower, which is several times the power output of conventional turboprop engines.

A conventional turboprop engine built to these requirements would further require the development of a relatively large and undesirably heavy reduction gearbox for transmitting the required power and torque at relatively low speed to the propeller. Such gearboxes tend to introduce losses which reduce the engine transfer efficiency. The rotational speed of the large diameter propeller is a limiting factor for keeping the helical velocity of the propeller tip, i.e., aircraft velocity plus tangential velocity of the propeller tip, below supersonic speeds. This is desirable inasmuch as a propeller tip operating at supersonic speeds generates a significant amount of undersirable noise and results in a loss of aerodynamic efficiency.

Gas turbine engines effective for driving propellers or fans without the use of a reduction gearbox are known in the prior art. They typically include relatively low speed, counterrotating turbine rotors having relatively few blade row stages driving a pair of counterrotating fans or propellers. These engines comprise various embodiments that utilize the fans or propellers for merely augmenting the thrust generated from the exhaust jet.

Such augmentation may be effective for some purposes. However, thrust augmentation requires that significant thrust is being produced by the exhaust gases exiting the power turbine and core nozzle. This reduces overall engine efficiency by degrading propulsive efficiency.

For propelling a modern, intermediate-sized aircraft that requires relatively large power output, a practical and relatively fuel efficient new generation engine having significant performance increases over conventional turbofan and turboprop engines and these counterrotating turbine rotor engines is required.

Accordingly, one object of the present invention is to provide a new and improved gas turbine engine.

Another object of the present invention is to provide a new and improved gas turbine engine for powering an aircraft at cruise speeds in excess of Mach 0.6 and less than 1.0 with improved overall engine efficiency.

Another object of the present invention is to provide a new and improved gas turbine engine including a power turbine having counterrotating rotors.

Another object of the present invention is to provide a new and improved gas turbine engine including a power turbine having a plurality of counterrotating turbine blade row stages wherein substantially all output power is obtained from expanding combustion gases through the stages.

Another object of the present invention is to provide a new and improved gas turbine engine wherein output power is obtainable without the use of a reduction gearbox.

Another object of the present invention is to provide a new and improved gas turbine engine effective for powering counterrotating airfoil members such as propellers.

SUMMARY OF THE INVENTION

The present invention comprises a new and improved gas turbine engine comprising a gas generator effective for generating combustion gases and means for efficiently transferring the energy of the gases into a net engine thrust. The means include a counterrotating power turbine with first and second counterrotating propellers. The power turbine includes a first rotor having a plurality of first turbine blade rows extending radially outwardly therefrom and a second rotor having a plurality of second turbine blade rows extending radially inwardly therefrom. The first and second rotors are arranged so as to define inner and outer flowpath surfaces, respectively, for the combustion gases flowing through the power turbine. The power turbine is effective for receiving the combustion gases and extracting substantially all the output power therefrom for driving the first and second rotors in counterrotating directions.

The first and second counterrotating propellers each have a plurality of blades attached to first and second rotatable nacelle rings, respectively. The first and second propellers are directly coupled to and driven by the first and second rotors, respectively, and are disposed radially outwardly of the power turbine. Each of the blades has a relatively high hub radius to tip radius ratio and relatively low thickness to chord ratio.

According to another form of the present invention, the means include an annular casing disposed radially outwardly of the gas generator and forming an outer contour. The contour has forward, intermediate, and aft portions. The forward portion defines an inlet optimally designed for the gas generator. The aft portion defines an aerodynamically smooth transition to the second rotatable nacelle ring. The intermediate portion defines the maximum radius of the casing which exceeds the hub radius of each of the first and second propellers.

According to another form, the present invention is a gas turbine engine comprising a gas generator effective for generating combustion gases and means for efficiently transferring the energy of the gases into a net engine thrust. The means include a power turbine, first and second counterrotating propellers, and an annular nacelle. The power turbine includes a first rotor having a plurality of first turbine blades extending radially outwardly therefrom and a second rotor having a plurality of second turbine blades extending radially inwardly therefrom. The first and second rotors are arranged so as to define inner and outer flowpath surfaces, respectively, for the combustion gases flowing through the power turbine. The power turbine is effective for receiving the combustion gases and extracting substantially all output power therefrom for driving the first and second rotors in counterrotating directions. The first and second counterrotating propellers each has a plurality of blades attached to first and second rotatable nacelle rings at first and second radii, respectively. The first and second propellers are directly coupled to and driven by the first and second rotors, respectively, and disposed radially outwardly of the power turbine. Each of the blades has a relatively high hub radius to tip radius ratio and relatively low thickness to chord ratio. The annular nacelle is disposed radially outwardly of the gas generator and forms an outer contour, the contour having forward, intermediate, and aft portions. The forward portion defines an inlet optimally designed for the gas generator. The aft portion forms an aerodynamically smooth transition to the second rotatable nacelle ring. The intermediate portion defines the maximum radius of the nacelle which exceeds each of the first and second radii.

BRIEF DESCRIPTION OF THE DRAWINGS

The invention, together with further objects and advantages thereof, is more particularly described in the following detailed description taken in conjunction with the accompanying drawings in which:

FIG. 6 is a more detailed view of the power turbine of the engine shown in FIG. 4.

DETAILED DESCRIPTION

Figure 1:
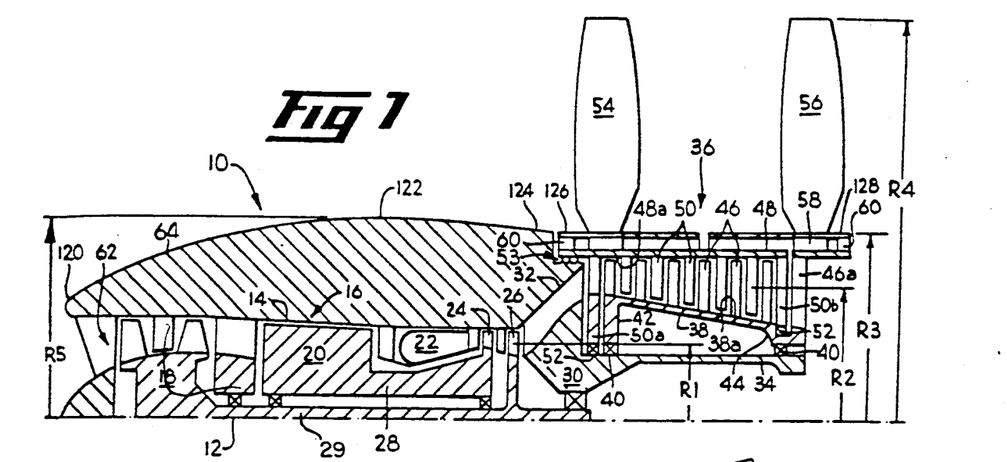
FIG. 1 is a schematic representation of a gas turbine engine according to one embodiment of the present invention including a power turbine having counterrotating rotors effective for driving counterrotating aft mounted propellers.

Illustrated in FIG. 1 is a gas turbine engine 10, or unducted fan engine, according to one embodiment of the present invention. The engine 10 includes a longitudinal centerline axis 12 and an annular casing 14 disposed coaxially about the axis 12. The engine 10 also includes a conventional gas generator 16, which, for example, can comprise a booster compressor 18, a compressor 20, a combustor 22, a high pressure turbine (HPT) 24, and an intermediate pressure turbine (IPT) 26 all arranged coaxially about the longitudinal axis 12 of the engine 10 in serial, axial flow relationship. A first annular drive shaft 28 fixedly interconnects the compressor 20 and the HPT 24. A second annular drive shaft 30 fixedly interconnects the booster compressor 18 and the IPT 26.

In operation, the gas generator 16 is effective for providing pressurized air from the booster 18 and the compressor 20 to the combustor 22 where it is mixed with fuel and suitably ignited for generating combustion gases. The combustion gases drive the HPT 24 and the IPT 26 which in turn drive the compressor 20 and the booster 18, respectively. The combustion gases are discharged from the gas generator 16 through the IPT 26 at a mean discharge radius R1 from the longitudinal axis 12.

Attached to an aftmost end of the casing 14 and aft of the gas generator 16 is an annular support member 30. The support member 30 extends radially inwardly and in an aft direction from the aft end of the casing 14. The support member 30 includes a plurality of circumferentially spaced strut members 32 extending radially inwardly from the aft end of the casing 14 and an annular hub member 34 fixedly attached to radially inner ends of the strut members 32 and extending in an aft direction. The strut members 32 are effective for supporting the hub member 34 and channeling combustion gases from the gas generator 16 to a power turbine 36 constructed in accordance with one embodiment of the present invention.

The energy of the combustion gases discharged from the gas generator will be efficiently transferred into a net engine thrust by means described more fully hereafter. Such means include the power turbine 36, or simply low pressure turbine (LPT) 36, which is rotatably mounted to the hub member 34.

The LPT 36 includes a first annular drum rotor 38 rotatably mounted by suitable bearings 40 to the hub member 34 at forward and aft ends 42 and 44 thereof. The first rotor 38 includes a plurality of first turbine blade rows 46 extending radially outwardly therefrom and spaced axially thereon.

The LPT 36 also includes a second annular drum rotor 48 disposed radially outwardly of the first rotor 38 and the first blade rows 46. The second rotor 48 includes a plurality of second turbine blade rows 50 extending radially inwardly therefrom and spaced axially thereon. The second rotor 48 is rotatably mounted to the hub member 34 by suitable bearings 52 disposed at radially inner ends of a forwardmost blade row 50a of the second blade rows 50 and at radially inner ends of an aftmost blade row 50b which is rotatably disposed on the first rotor 38 mounted to the hub member 34.

As shown in FIG. 1, an annular flowpath for combustion gases flowing through blade rows 46 and 50 is bounded by first drum rotor 38 and second drum rotor 48. In addition to bounding the flowpath, first and second drum rotors 38 and 48 define inner and outer flowpath surfaces 38a and 48a, respectively. In this manner, LPT 36 is lighter than typical prior art turbines which include relatively large disks.

Each of the first and second turbine blade rows 46 and 50 comprises a plurality of circumferentially spaced turbine blades, with the first blade rows 46 alternately spaced or interspersed with respective ones of the second blade rows 50. Combustion gases flowing through the blade rows 46 and 50 flow along a mean flowpath radius R2 which, by definition, represents a blade radius at which resultant work loads of the LPT 36 are assumed to be concentrated. For example, radius $R_2$ can be defined as the mean pitch line radius of all the blade rows of the LPT 36.

Combustion gases being discharged from the gas generator 16 at the mean flowpath radius R1 are channeled through the strut members 32 to the LPT 36. The LPT 36 is effective for expanding the combustion gases through the first and second turbine blade rows 46 and 50 along the mean flowpath radius R2 for extracting substantially all output power from the gases for driving the first and second rotors 38 and 48 in counterrotating directions at rotational speeds relatively lower than those of the first drive shaft 28.

The gas generator 16 and the LPT 36 as above arranged and described results in a new and improved gas turbine engine having counterrotating rotors effective for providing output shaft power at relatively low rotational speeds. Significant features of the present invention include the complimentary arrangement of the engine elements. More specifically, the HPT 24 is disposed aft of the combustor 22 for first receiving the relatively high pressure combustion gases being discharged therefrom. The HPT 24 is most efficient when it and the first drive shaft 28 are designed to rotate at about 10,000 to 15,000 RPM in a 15,000 shaft horsepower engine. This rotational speed efficiently utilizes the high pressure combustion gases from the combustor 22.

The combustion gases after passing through the HPT 24 are at a reduced, intermediate pressure. The intermediate pressure gases then flow through the IPT 26 which further reduces the pressure of the gases to a relatively low pressure while most efficiently extracting power for rotating the second drive shaft 30 and the booster compressor 18 at speeds relatively lower than those of the HPT 24.

Finally, the low pressure combustion gases are channeled to the LPT 36 where they are further expanded and substantially all of the remaining energy thereof is extracted for rotating the first and second rotors 38 and 48 for providing output shaft power. Little energy remains for the generally inefficient thrust produced by the relatively high velocity gases in the exhaust jet discharged from the LPT 36. Furthermore, inasmuch as the LPT 36 is the last element in the engine 10, it is subject to the lowest temperature combustion gases and therefore, thermally induced stresses are reduced.

For more efficiently extracting energy from the combustion gases in the LPT 36 it is preferable that the mean flowpath radius R2 thereof be greater than the mean discharge radius R1 of the gas generator 16. In the embodiment illustrated in FIG. 1, the mean flowpath radius R2 is about double the magnitude of the mean discharge radius R1. This arrangement is effective for placing the turbine blade rows 46 and 50 at an increased radius from the longitudinal axis 12 for increasing the relative tangential velocities thereof for reducing blade loading thereby efficiently extracting power from the gases flowing thereover.

In the exemplary embodiment shown in FIG. 1, the LPT 36 is effective for driving counterrotating, oppositely pitched forward propellers 54 and aft propellers 56. More specifically, extending from an aftmost end of the first rotor 38 is an aft blade row 46a which extends radially outwardly to about the radial position of the second rotor 48. Attached to radially outer ends of the aft blade row 46a is an annular shroud member 58 including an aft rotatable nacelle ring 128 adapted for the smooth flow of air thereover. The aft propellers 56 are suitably attached to the shroud member 58. Similarly, the forward propellers 54 are suitably attached to an annular shroud member with forward rotatable nacelle ring 126 which is attached to a forward end of the second rotor 48. Suitable pitch varying means 60 are provided for independently controlling the pitch of the forward and aft propellers 54 and 56. Each annular nacelle ring which surrounds the power turbine and the plurality of propeller blades mounted on the ring form a propeller system.

A most significant feature of the present invention is a gas turbine engine 10 including an LPT 36 effective for providing relatively high output power and torque at relatively low rotational speeds without the use of a reduction gearbox. A reduction gearbox, and related accessories, would add a significant amount of weight and complexity to an engine capable of generating the relatively large thrust required for powering a transport aircraft such as the 150 passenger transport. Moreover, any losses attributable to the gearbox reduce the transfer efficiency.

Speed reduction is required where a gas turbine engine is used for driving airfoil members such as propellers or fans. A conventional low pressure turbine (not shown) includes a single rotor typically rotating at about 10,000 to 15,000 RPM. These rotational speeds must be reduced to relatively low speeds of about 1,000 to about 2,000 RPM for driving airfoil members. Propellers and fans are designed for moving a relatively large amount of air at relatively low axial speeds for generating thrust, and operate more efficiently at the relatively low rotational speeds. Additionally, the low rotational speeds are required for limiting the helical tip speed of the propellers to below supersonic speeds.

According to the present invention, by allowing the second rotor 48 in FIG. 1 of the LPT 36 to rotate in a direction opposite the first rotor 38, two output shafts, first rotor 38 and second rotor 48, are provided which rotate at about one quarter the speed of a single rotor, conventional LPT of an equivalent output power, thereby providing speed reduction.

Furthermore, additional speed reduction is obtainable by increasing the number of the first and second turbine blade rows 46 and 50, i.e., the number of stages. By increasing the number of blade rows, the amount of energy extracted per stage is reduced. This allows for a reduction of the speed of the rotor and the aerodynamic loading of the blades on each row. Thus, in order to obtain the desired reduced speeds and efficiently extract (by reduced blade loading) substantially all remaining power from the combustion gases, an increased number of stages would be required.

However, a fewer number of stages could be used for accomplishing these objectives by having increased values of the ratio R2/R1 for providing the combustion gases to the LPT 36 at a larger mean flowpath radius R2. Too many stages are undesirable because of the increased complexity, size and weight therefrom, and an LPT 36 having fewer stages and a relatively high R2/R1 ratio is undesirable because of the increased frontal area and weight attributable thereto. As above-described and in accordance with the present invention, it has been determined that an R2/R1 ratio of about 2.0 is preferable.

Furthermore, in the embodiment illustrated in FIG. 1 for driving the counterrotating propellers 54 and 56, the LPT 36 having about 14 stages is preferred for obtaining output shaft speeds of the first and second rotors 38 and 48 of about 1200 RPM. This speed is much less than the rotational speeds of the first and second drive shafts 28 and 30. Moreover, and in accordance with the present invention, LPT 36 has a total number of rows of blades effective to maintain the tip speeds of the propeller blades below sonic velocity.

The reduction in speed of the rotors 38 and 48 of the LPT 36 results in a second order reduction of centrifugally generated stresses. For example, a one quarter reduction in speed results in a seven-sixteenths reduction in centrifugal stress. This is significant in that the LPT 36 requires less material for accommodating centrifugal stress which results in a lighter LPT 36. For example, use of drum rotors 38 and 48 rather than disks significantly reduces weight. The overall effect of using a counterrotating LPT 36 is a significant reduction in engine weight as compared to an engine including a conventional LPT and reduction gearbox.

Means for improving transfer efficiency may also include a seal 53 which is disposed between casing 14 and second drum rotor 48. By this arrangement, the leakage or flow of combustion gases between stationary casing 14 and rotor 48 will be reduced. This arrangement provides a single seal in the relatively high pressure region of the flowpath proximate to strut members 32 and forward of the LPT 36. No other relatively high diameter leakage areas exist until just aft of the aftmost blade row 50b. At such aft location, the pressure of the combustion gases is greatly reduced, and; thus, any leakage in this region will be small relative to leakage locations further upstream.

Figure 4:
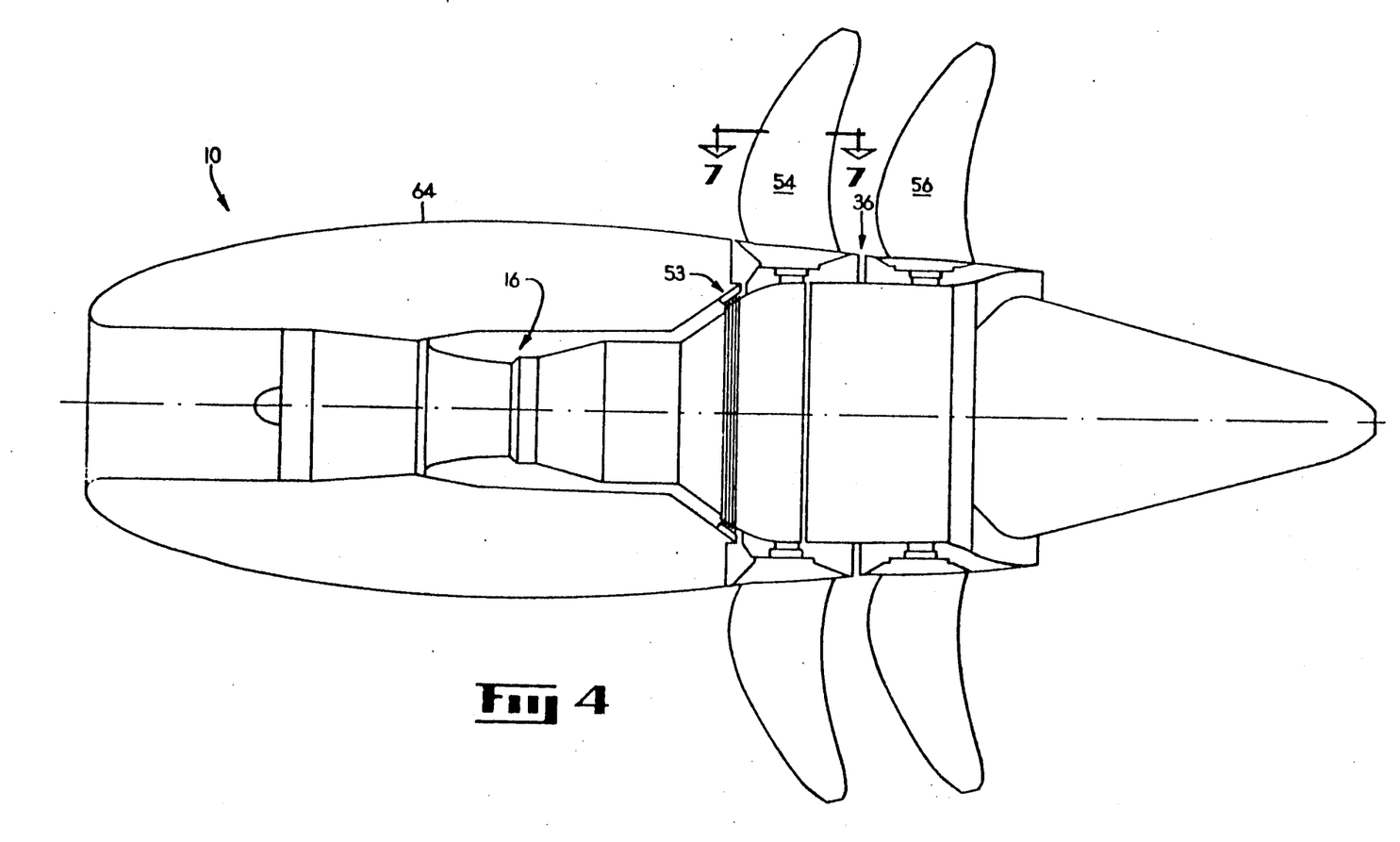
FIG. 4 is a view of a gas turbine engine according to another form of the present invention.
Figure 7:
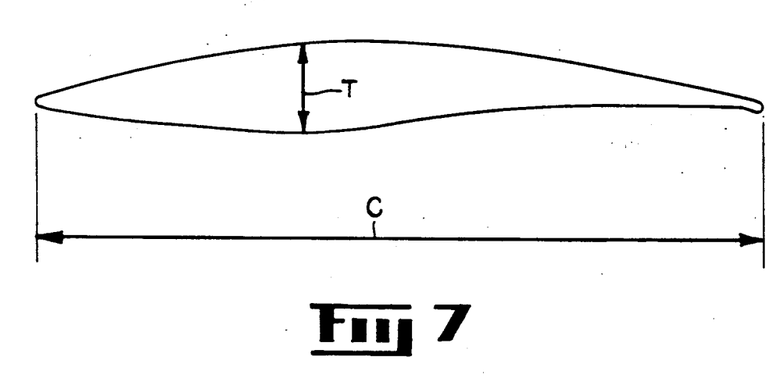
FIG. 7 is an enlarged view taken along the line 7—7 in FIG. 4.

Means for improving transfer efficiency further include counterrotating propellers 54 and 56, aft mounted to the engine 10 radially outwardly of both the first rotor 38 and the second rotor 48. These propellers have a hub radius R3 and a tip radius R4 from the longitudinal axis 12. What is meant by "hub radius" is the distance measured from engine centerline 12 to the outer surface of the rotatable nacelle ring from which each propeller blade extends. In a like manner, "tip radius" is the distance measured from engine centerline 12 to the radially outer end of each propeller blade. Mounting the propellers 54 and 56 radially outwardly of the second rotor 48 increases the hub to tip ratio R3/R4 of the propellers to a relatively high value when compared to conventional gear driven propellers which typically have a small hub radius and thus relatively low hub to tip ratio. This arrangement provides an improvement in aerodynamic performance. For example, hub radius to tip radius ratio is greater than about 0.4 and between about 0.5 to 0.4 in a preferred embodiment. Furthermore, the propellers do not obstruct the flow of combustion gases discharged from the LPT 36, which would otherwise reduce engine performance and require cooling schemes for preventing thermal damage to the propellers 54 and 56. Other features of the blades of propellers 54 and 56 are best shown in FIGS. 4 and 7. Each blade is swept back toward the tip. Such sweep reduces the relative Mach number of the tip which reduces losses at cruise Mach numbers in excess of 0.6. Each blade is further provided with a twist from root to tip to provide proper chord orientation for increased blade speed with increase in radius. Each blade has relatively low thickness (T) to chord (C) ratio, as shown by the blade section in FIG. 7. For example, T/C is less than 0.14 at the blade hub and is about 0.02 at the tip.

The use of two propellers over a single propeller allows for propellers of lesser diameter. For example, at aircraft cruise speeds of about Mach 0.7 to about Mach 0.8, two propellers with diameter of about 12 feet and rotational speed of about 1200 RPM will generate an equivalent amount of thrust to a single propeller of about 16 feet at a rotational speed of about 900 RPM. The reduced diameter results in reduced propeller tip speeds and noise therefrom.

In the embodiment of engine 10 having a power turbine with about 14 stages, it is also preferred that R1/R4, R2/R4, and R3/R4, equal about 0.18, 0.35, and 0.45, respectively. However, the number of stages of the LPT 36 can range between about 10 and about 18 stages, and R1/R4, R2/R4, and R3/R4 can range between about 0.2 to 0.16, 0.4 to 0.3, and 0.5 to 0.4, all respectively. Within these preferred ranges, LPT 36 will be effective to extract substantially all of the usable energy from the exhaust gases. In the context of this invention, "substantially all" is used in the sense of an amount of the order of 80% or more (preferably 90% as more), under most circumstances. These relationships are preferred for obtaining an engine 10 suitable for most efficiently driving the counterrotating propellers 54 and 56 at rotational speeds of about 1200 RPM.

The embodiment of the engine 10 illustrated in FIG. 1 results in additional advantages. For example, by mounting the propellers 54 and 56 to the aft end of the engine 10, an annular inlet region 62 of the engine 10 is relatively free of flow disturbing obstructions. Accordingly, the inlet region 62 and an annular nacelle 64 surrounding the engine 10 can be suitably designed for obtaining increased aerodynamic performance of air entering the engine 10 as well as flowing thereover.

Annular nacelle 64 contributes to the transfer efficiency of engine 10. Nacelle 64 forms an outer contour which includes forward, aft, and intermediate portions 120, 122, and 124, respectively. The outer contour is the only surface defining the flowpath of air to propellers 54 and 56. Forward portion 120 defines an inlet for inlet region 62 optimally designed for gas generator 16 without concern for flow disturbing obstructions. Aft portion 124 forms an aerodynamically smooth transition to forward rotatable nacelle ring 126. Intermediate portion 122 defines the maximum radius R5 of casing which is greater than the hub radius R3 of propeller 54 (R3 also being the radius of forward rotatable nacelle ring 126). With R5 greater than R3, flow over nacelle 64 will diffuse as it passes intermediate portion 122 thereby reducing the velocity of air near the hub of propeller 54. This reduces losses and improves the efficiency of the propeller.

Figure 2:
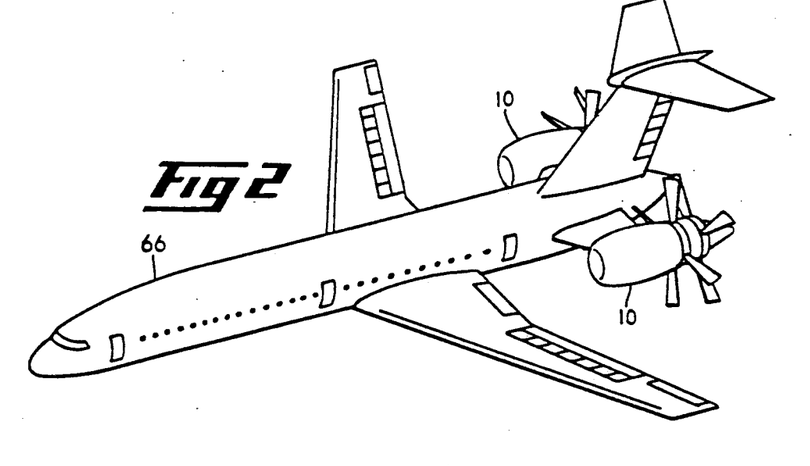
FIG. 2 illustrates an aircraft including two gas turbine engines such as in FIG. 1 mounted to an aft end thereof.

Illustrated in FIG. 2 is an aircraft 66 including two engines 10 driving counterrotating propellers, such as the one illustrated in FIG. 1, mounted to an aftmost end of the aircraft 66. Aft mounted counterrotating propeller engines 10 according to the present invention are effective for providing an aircraft 66 having improved performance and fuel burn. Furthermore, the engines 10 have reduced weight when compared with a conventional turboprop engine sized for identical thrust output. Reduced propeller noise is realizable which allows for a reduction in the amount of noise attenuation modifications to the aircraft, and thus additionally reduces total aircraft weight.

Figure 3:
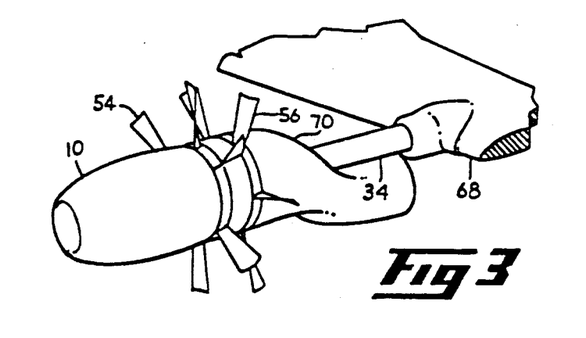
FIG. 3 is a view illustrating an alternative arrangement for mounting a gas turbine engine such as illustrated in FIG. 1 to a wing of an aircraft.

Illustrated in FIG. 3 is an alternative arrangement for mounting counterrotating propeller engines 10, such as the one illustrated in FIG. 1, to a wing 68 of an aircraft (not shown). In this embodiment, the hub member 34 of the engine 10 is extended in an aft direction and suitably mounted to the wing 68. A stationary, annular exhaust duct 70 is suitably secured to the hub member 34 for suitably channeling the exhaust gases of the engine 10, for example, under the wing 68. The embodiment of the engine 10 illustrated in FIG. 3 clearly illustrates a significant advantage of the support member 30 of the engine 10. More specifically, the support member 30 is not only effective for mounting the LPT 36 in the engine 10 but is also effective for mounting the entire engine 10 to a wing 68 of an aircraft.

Figure 5:
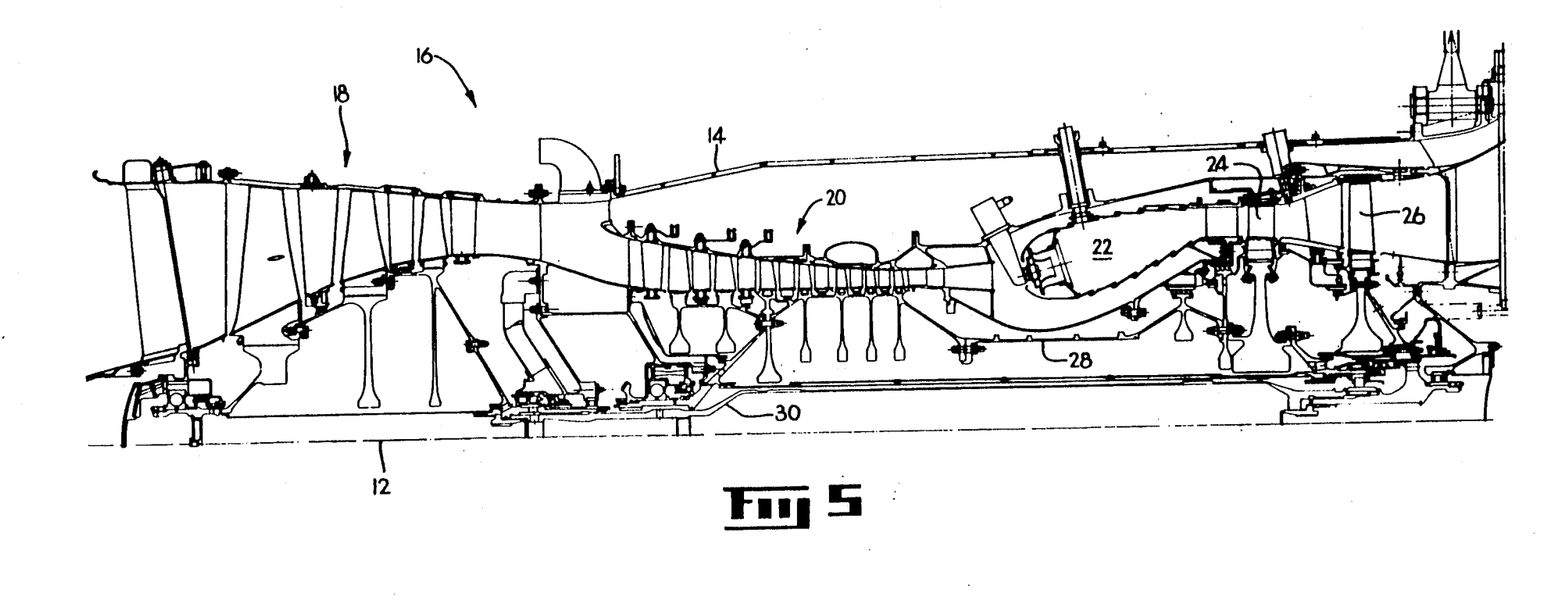
FIG. 5 is a more detailed view of the gas generator of the engine shown in FIG. 4.

Illustrated in FIGS. 4-7 is a more detailed cross sectional view of an actual gas turbine engine 10 according to a preferred embodiment of the present invention. Engine 10 comprises a gas generator 16 for generating combustion gases. Detail of gas generator 16 is shown in FIG. 5 with like numbers for similar components carried forward from FIG. 1.

Engine 10 further comprises means for efficiently transferring the energy of the combustion gases into a net engine thrust which includes LPT 36, forward and aft C/R propellers 54 and 56, respectively, and annular casing 64.

Power turbine or LPT 36 is shown in greater detail in FIG. 6 with like numbers for similar components carried forward from FIG. 1. Although basically the same as LPT 36 shown in FIG. 1, the FIG. 6 LPT 36 includes several different features. These include a plurality of inlet guide vanes 49a located axially forward of first and second blade rows 46 and 50. Similarly, outlet guide vanes 49b are located axially aft of blade rows 46 and 50. Inlet guide vanes 49a are effective for imparting a circumferential swirl to the combustion gases whereas outlet guide vanes 49b are effective for removing substantially all circumferential swirl from gases passing therethrough. In this manner, more work may efficiently be extracted from the forward and aftmost blade rows of LPT 36 thereby improving its efficiency.

The blades of aft and forward counterrotating propellers 56 and 54 are attached to first and second rotatable nacelle rings 128 and 126, at first and second radii R6 and R7, respectively. Radii R6 and R7 correspond to the hub radii of propellers 56 and 54, respectively. Aft propeller 56 is directly coupled to and driven by first rotor 38 and forward propeller 54 is directly coupled to and driven by second rotor 48. Annular nacelle rings 126 and 128 form the only surfaces controlling the airflow in the region of the propeller blades.

Counterrotating propellers 54 and 56 are disposed radially outwardly of LPT 36. In a preferred embodiment, each of forward propeller 54 and aft propeller 56 is axially positioned between forward and aft ends of LPT 36. In this manner, improved dynamic stability of the engine is achieved.

Located forward of LPT 36 are a plurality of strut members 32 which extend radially inwardly through the flowpath and are fixedly attached at their radially inner ends to annular hub member 34. In this manner, strut members 32 are effective for both supporting hub member 34 and channeling combustion gases from the gas generator to LPT 36.

First annular drum rotor 38 includes radially inwardly extending carrier members 130, 132, and 134. Each of carrier members 130, 132, and 134 is generally conically-shaped with the radially inner ends of members 130 and 132 being connected by a generally cylindrical carrier member 136. Rotor 38 is rotatably mounted to hub member 34 by roller bearing 138 and thrust bearing 139. Roller bearing 138 is located generally in the forward portion of LPT 36 at the conjunction of carrier members 130 and 136. Thrust bearing 139 is located in the generally aft portion of LPT 36 and at the radially inner end of carrier member 134. Hub member 34 is provided with a generally cylindrical forward hub member portion 34a and a generally cylindrical aft hub member portion 34b extending radially from hub member 34 proximate bearings 138 and 139, respectively. In this manner, hub member 34 provides improved support for rotor 38.

Second rotor 48 includes generally conical carrier members 140 and 142. Rotor 48 is supported to carrier member 136 of rotor 38 by differential thrust bearing 144 and differential roller bearing 146. Differential thrust bearing 144 is located at the radially inner end of carrier member 140 and differential roller bearing 146 is located at the radially inner end of carrier member 142.

In operation, rotor 38 will rotate about annular hub member 34 in a first direction. At the same time, rotor 48 will rotate in a second direction opposite to that of the first direction. By the use of differential bearings 144 and 146, rotor 48 is maintained in spaced axial and radial relationship with rotor 38 while simultaneously being counterrotatable therewith.

FIG. 6 further discloses a pitch change mechanism 150. This mechanism is disclosed and described more fully in U.S. Pat. application Ser. No. 647,283, filed Sept. 4, 1984 by Thomas G. Wakeman et al. and assigned to the assignee of the present application, now U.S. Pat. No. 4,657,484, issued Apr. 14, 1987, which is incorporated herein by reference.

While there have been described herein what are considered to be preferred embodiments of the present invention, other embodiments will occur to those skilled in the art from the teachings herein.

For example, the gas generator 16 of FIG. 1 without a booster compressor 18 and IPT 26 can also be used for generating combustion gases. Furthermore, inasmuch as the counterrotating LPT 36 is effective for providing relatively large output power and torque at low speeds, gas turbine engines incorporating such LPTs can be used for powering ships, generators, and large pumps, for example, which can be designed for having counterrotating input shafts suitably attached to the first and second rotors 38 and 48 of the LPT 36.

Furthermore, although the invention has been described as applied to a 15,000 shaft horsepower engine, it can also be sized for other engine classes. For example, in a smaller, 1500 shaft horsepower engine, powering shorter propellers 54 and 56, the HPT 24 would be designed to operate at about 30,000 RPM. The first rotor 38 and the second rotor 48 of the LPT 36 of FIG. 1 would be correspondingly designed to operate at about a 10 to 1 speed reduction, i.e., at about 3,000 RPM. The propellers 54 and 56, although operating at about 3,000 RPM, have reduced tip radii $R_4$ and therefore the helical tip speeds can be maintained below supersonic speeds.

Accordingly, having thus described the invention, what is desired to be secured by Letters Patent of the United States is:

1. In a gas turbine engine for powering an aircraft at a cruise speed in excess of Mach 0.6 comprising:
   a gas generator effective for generating combustion gases;
   a power turbine including a first rotor having a plurality of first turbine blade rows extending radially outwardly therefrom and a second rotor having a plurality of second turbine blade rows extending radially inwardly therefrom, wherein:
      said first and second rotors are arranged so as to define inner and outer flowpath surfaces, respectively, for said combustion gases flowing through said power turbine; and
      said power turbine is effective for receiving said combustion gases and extracting substantially all usable output power therefrom for driving said first and second rotors in counterrotating directions to generate substantially all thrust produced by said engine;
   an annular casing disposed circumferentially about said gas generator; and
   a seal disposed between said casing and said second rotor to reduce the flow of combustion gases therethrough.

2. A gas turbine engine for powering an aircraft at a cruise speed in excess of Mach 0.6 including a longitudinal axis comprising:
   an annular casing disposed coaxially about said axis;
   a gas generator disposed in said casing and including a compressor, combustor and a high pressure turbine in serial flow relationship, said high pressure turbine being effective for first receiving combustion gases from said combustor for driving said compressor through a drive shaft fixedly connected thereto, said gas generator being effective for exhausting said combustion gases therefrom substantially at a mean discharge radius from said longitudinal axis and in an aft direction;
   a power turbine disposed coaxially about said longitudinal axis and including:
      a first drum rotor arranged so as to define an inner flowpath surface for said combustion gases flowing through said power turbine;
      a plurality of first turbine blade rows extending radially outwardly from said first rotor and spaced axially thereon;
      a second drum rotor arranged so as to define an outer flowpath surface for said combustion gases flowing through said power turbine and disposed radially outwardly of said first rotor and said first turbine blade rows; and
      a plurality of second turbine blade rows extending radially inwardly from said second rotor and alternately spaced with respective ones of said plurality of said first turbine blade rows;
   said power turbine being effective for receiving said combustion gases from said gas generator and expanding said gases through said first and second turbine blade rows along a mean flowpath radius for extracting substantially all usable output power therefrom for driving said first and second rotors in counterrotating directions at speeds relatively lower than those of said drive shaft;
   a seal disposed between said casing and said second rotor to reduce the flow of combustion gases therethrough; and
   first and second counterrotating propellers driven by said first and second rotors, respectively, for producing substantially all thrust generated by said engine.

3. A gas turbine engine according to claim 2 wherein:
   a total number of said first and second turbine blade rows is less than about 19 rows and more than about 9 rows.

4. A gas turbine engine according to claim 2 wherein:
   said propellers have a tip radius and a hub radius; and
   said mean discharge radius of said gas generator, said mean flowpath radius of said power turbine and said hub radius of said propellers have magnitudes with respect to said tip radius of said propellers of between about 0.2 to about 0.16, 0.4 to about 0.3, 0.5 to about 0.4, respectively, corresponding to a total number of said first and second turbine blade rows greater than about 9 rows and less than about 19 rows, respectively.

5. A gas turbine engine comprising:

a gas generator effective for generating combustion gases; and means for efficiently transferring the energy of said gases into a net engine thrust, said means including:
   a. a power turbine including a first rotor having a plurality of first turbine blade rows extending radially outwardly therefrom and a second rotor having a plurality of second turbine blade rows extending radially inwardly therefrom, wherein:
      i. said first and second rotors are arranged so as to define inner and outer flowpath surfaces, respectively, for said combustion gases flowing through said power turbine; and
      ii. said power turbine is effective for receiving said combustion gases and extracting usable output power therefrom for driving said first and second rotors in counterrotating directions;
   b. first and second counterrotating propellers, for producing substantially all thrust generated by said engine, each with a plurality of blades attached to first and second rotatable nacelle rings, respectively, wherein:
      i. said first and second propellers are directly coupled to and driven by said first and second rotors, respectively, and disposed radially outwardly of said power turbine; and
      ii. each of said blades has a relatively high hub radius to tip radius ratio.

6. A gas turbine engine comprising:

a gas generator effective for generating combustion gases; and means for efficiently transferring the energy of said gases into a net engine thrust, said means including:
   a. a power turbine including a first rotor having a plurality of first turbine blades extending radially outwardly therefrom and a second rotor having a plurality of second turbine blades extending radially inwardly therefrom, wherein:
      i. said first and second rotors are arranged so as to define inner and outer flowpath surfaces, respectively, for said combustion gases flowing through said power turbine; and
      ii. said power turbine is effective for receiving said combustion gases and extracting usable output power therefrom for driving said first and second rotors in counterrotating directions;
   b. first and second counterrotating propellers, for producing substantially all thrust generated by said engine, each with a plurality of blades attached to first and second rotatable nacelle rings at first and second radii, respectively, wherein:
      i. said first and second propellers are directly coupled to and driven by said first and second rotors, respectively, and disposed radially outwardly of said power turbine; and
      ii. each of said blades has a relatively high hub radius to tip radius ratio and relatively low thickness to chord ratio;
   c. an annular nacelle disposed radially outwardly of said gas generator and forming an outer contour, said contour having forward, intermediate, and aft portions, wherein:
      said intermediate portion defines the maximum radius of said nacelle which exceeds each of said first and second radii.

7. A gas turbine engine comprising:

a gas generator effective for generating combustion gases; and means for efficiently transferring the energy of said gases into a net engine thrust, said means including:
   a. a power turbine including a first rotor having a plurality of first turbine blade rows extending radially outwardly therefrom and a second rotor having a plurality of second turbine blade rows extending radially inwardly therefrom, wherein:
      i. said first and second rotors are arranged so as to define inner and outer flowpath surfaces, respectively, for said combustion gases flowing through said power turbine; and
      ii. said power turbine is effective for receiving said combustion gases and extracting usable output power therefrom for driving said first and second rotors in counterrotating directions;
   b. first and second counterrotating propellers, for producing substantially all thrust generated by said engine, each with a plurality of blades attached to first and second rotatable nacelle rings at first and second radii, respectively, wherein:
      i. said first and second propellers are directly coupled to and driven by said first and second rotors, respectively, and disposed radially outwardly of said power turbine; and
      ii. each of said blades has a relatively high hub radius to tip radius ratio and relatively low thickness to chord ratio; and
   c. an annular nacelle disposed radially outwardly of said gas generator and forming an outer contour, said outer contour being the only surface defining the flowpath of air to said propellers, said contour having forward, intermediate, and aft portions, wherein:
      said intermediate portion defines the maximum radius of said nacelle which exceeds each of said first and second radii.

8. A gas turbine engine according to claim 7 wherein said power turbine further comprises:
   a plurality of inlet guide vanes located axially forward of said first and second blade rows, said inlet guide vanes being effective for imparting a circumferential swirl to said combustion gases; and
   a plurality of outlet guide vanes located axially aft of said first and second blade rows, said outlet guide vanes being effective for removing substantially all circumferential swirl from said gases passing therethrough.

9. A gas turbine engine according to claim 7 wherein:
   the total number of said first and second rows is less than about 19 rows and more than about 9 rows;
   said combustion gases are exhausted from said gas generator at a mean discharge radius from the longitudinal axis of said engine;
   said gases are expanded through said power turbine along a mean flowpath radius; and
   said mean flowpath radius is about double the magnitude of said mean discharge radius.

10. A gas turbine engine according to claim 7 wherein:

said hub radius to tip radius ratio is greater than about 0.4; and the total number of said first and second rows is less than about 19 rows and more than about 9 rows.

11. A gas turbine engine according to claim 10 wherein:

said hub radius to tip radius ratio is between about 0.5 to about 0.4.

12. A gas turbine engine according to claim 7 wherein said thickness to chord ratio of said propeller blades is less than 0.14 at the hub and is about 0.02 at the blade tip.

13. A gas turbine engine according to claim 7 wherein each of said first and second counterrotating propellers is axially positioned between forward and aft ends of said power turbine.

14. A gas turbine engine comprising:

a gas generator effective for generating combustion gases and having an annular casing disposed circumferentially thereabout; and means for efficiently transferring the energy of said gases into a net engine thrust, said means including:
  a. a power turbine including a first rotor having a plurality of first turbine blade rows extending radially outwardly therefrom and a second rotor having a plurality of second turbine blade rows extending radially inwardly therefrom, wherein:
     i. said first and second rotors are arranged so as to define inner and outer flowpath surfaces, respectively, for said combustion gases flowing through said power turbine; and
     ii. said power turbine is effective for receiving said combustion gases and extracting substantially all output power therefrom for driving said first and second rotors in counterrotating directions;
  b. first and second counterrotating propellers, each with a plurality of blades attached to first and second rotatable nacelle rings at first and second radii, respectively, wherein:
     i. said first and second propellers are directly coupled to and driven by said first and second rotors, respectively, and disposed radially outwardly of said power turbine; and
     ii. each of said blades has a relatively high hub radius to tip radius ratio and relatively low thickness to chord ratio;
  c. an annular nacelle disposed radially outwardly of said gas generator and forming an outer contour, said outer contour being the only surface defining the flowpath of air to said propellers, said contour having forward, intermediate, and aft portions, wherein:
     said intermediate portion defines the maximum radius of said nacelle which exceeds each of said first and second radii; and
  d. a seal disposed between said casing and said second rotor to reduce the flow of combustion gases therethrough.

15. A gas turbine engine comprising:

a gas generator effective for generating combustion gases and having an annular casing disposed circumferentially thereabout; and means for efficiently transferring the energy of said gases into a net engine thrust, said means including:
  a. a power turbine including a first rotor having a plurality of first turbine blade rows extending radially outwardly therefrom and a second rotor having a plurality of second turbine blade rows extending radially inwardly therefrom, wherein:
     i. said first and second rotors are arranged so as to define inner and outer flowpath surfaces, respectively, for said combustion gases flowing through said power turbine;
     ii. said power turbine is effective for receiving said combustion gases and extracting substantially all usable output power therefrom for driving said first and second rotors in counterrotating directions;
     iii. the total number of said first and second rows is less than about 19 rows and more than about 9 rows; and
     iv. said combustion gases are exhausted from said gas generator at a mean discharge radius from the longitudinal axis of said engine, said gases are expanded through said power turbine along a mean flowpath radius, and said mean flowpath radius is about double the magnitude of said mean discharge radius;
  b. first and second counterrotating propellers, each with a plurality of blades attached to first and second rotatable nacelle rings at first and second radii, respectively, wherein:
     i. said first and second propellers are directly coupled to and driven by said first and second rotors, respectively, and disposed radially outwardly of said power turbine; and
     ii. each of said blades has a hub radius to tip radius ratio which is greater than about 0.4 and a thickness to chord ratio of less than 0.14 at the hub;
  c. an annular nacelle disposed radially outwardly of said gas generator and forming an outer contour, said outer contour being the only surface defining the flowpath of air to said propellers, said contour having forward, intermediate, and aft portions, wherein:
     said intermediate portion defines the maximum radius of said nacelle which exceeds each of said first and second radii; and
  d. a seal disposed between said casing and said second rotor to reduce the flow of combustion gases therethrough.

16. A gas turbine engine according to claim 15 wherein said power turbine further comprises:

a plurality of inlet guide vanes located axially forward of said first and second blade rows, said inlet guide vanes being effective for imparting a circumferential swirl to said combustion gases; and a plurality of outlet guide vanes located axially aft of said first and second blade rows, said outlet guide vanes being effective for removing substantially all circumferential swirl from said gases passing therethrough.

17. An unducted fan engine for subsonic aircraft comprising:

a) a gas generator including a compressor, a combustor and a high pressure turbine for driving said compressor, b) a power turbine for receiving the hot gases exhausted from said high pressure turbine, c) said power turbine including a first rotor having a plurality of turbine blade rows extending radially outwardly therefrom and a second rotor having a plurality of turbine blade rows extending radially inwardly therefrom and interspersed with the blade rows of the first rotor, d) said first and second rotors having generally annular inner and outer surfaces defining the flowpath for the hot gases flowing through said power turbine, and e) first and second propeller systems each having an annular nacelle ring surrounding the power turbine and a plurality of propeller blades mounted on said ring, f) one of said rings being mounted on and driven directly by said first power turbine rotor and the second of said rings being mounted on and driven directly by the second power turbine rotor whereby said propeller systems are rotated in opposite directions by said rotors, g) said power turbine being effective to remove energy from the gases passing through it so that said propeller blades are driven thereby to produce substantially all the thrust generated by said engine.

18. An unducted fan engine according to claim 17 wherein:
said engine further includes a nacelle surrounding said gas generator and forming the only surface for guiding the air to said propeller blades, and said annular nacelle rings form the only surfaces controlling the air flow in the region of said blades.

19. A gas turbine engine for powering an aircraft at a cruise speed in excess of Mach 0.6 comprising:
a gas generator effective for generating combustion gases; and
means for efficiently transferring the energy of said gases into a net engine thrust, said means including:
 a. a counterrotating power turbine which is effective for receiving said combustion gases and extracting usable output power therefrom; and
 b. counterrotating propeller blades directly coupled to and driven by said counterrotating power turbine to produce substantially all thrust generated by said engine, said blades having a sweep which provides reduced tip losses when the aircraft travels at a speed in excess of Mach 0.6, as compared with the tip losses which would occur with unswept blades traveling at Mach 0.6 and at the same rotational speed.

20. A gas turbine engine, as recited in claim 19, wherein each blade has a relatively high hub radius to tip radius ratio.

21. A gas turbine engine, as recited in claim 20, wherein each blade has a relatively low thickness to chord ratio.

22. A gas turbine engine, as recited in claim 19, further comprising:
 c. an annular nacelle disposed forward of said propeller blades, having a greater radius than said blade hub radius.

23. An unducted fan engine for subsonic aircraft comprising:
 a. a gas generator including a compressor, a combustor and a high pressure turbine for driving said compressor,
 b. a power turbine for receiving the hot gases exhausted from said high pressure turbine,
 c. said power turbine including a first rotor having a plurality of turbine blade rows extending radially outwardly therefrom and a second rotor having a plurality of turbine blade rows extending radially inwardly therefrom and interdigitated with the blade rows of the first rotor, d. said first and second rotors having generally annular inner and outer surfaces defining the flowpath for the hot gases flowing through said power turbine;

e. first and second propeller systems each having;
 i. an annular nacelle ring surrounding the power turbine,
 ii. a plurality of propeller blades mounted on said ring, and
 iii. pitch control means for varying the pitch of the propeller blades;

f. one of said rings being mounted on and driven directly by said first power turbine rotor and the second of said rings being mounted on and driven directly by the second power turbine rotor whereby said propeller systems are rotated in opposite directions by said rotors; and g. said power turbine being effective to remove energy from the gases passing through it so that said propeller blades are driven thereby to produce substantially all the thrust generated by said engine.

24. A gas turbine engine for powering an aircraft at a cruise speed in excess of Mach 0.6 including a longitudinal axis comprising:
an annular casing disposed coaxially about said axis;
a gas generator disposed in said casing and including a compressor, combustor and a high pressure turbine in serial flow relationship, said high pressure turbine being effective for first receiving combustion gases from said combustor for driving said compressor through a drive shaft fixedly connected thereto, said gas generator being effective for exhausting said combustion gases therefrom substantially at a mean discharge radius from said longitudinal axis and in an aft direction;
a power turbine disposed coaxially about said longitudinal axis and including:
 a first drum rotor arranged so as to define an inner flowpath surface for said combustion gases flowing through said power turbine;
 a plurality of first turbine blade rows extending radially outwardly from said first rotor and spaced axially thereon;
 a second drum rotor arranged so as to define an outer flowpath surface for said combustion gases flowing through said power turbine and disposed radially outwardly of said first rotor and said first turbine blade rows; and
 a plurality of second turbine blade rows extending radially inwardly from said second rotor and alternately spaced with respective ones of said plurality of said turbine blade rows;
said power turbine being effective for receiving said combustion gases from said gas generator and expanding said gases through said first and second turbine blade rows along a mean flowpath radius for extracting substantially all output power therefrom for driving said first and second rotors in counterrotating directions at speeds relatively lower than those of said drive shaft;
a seal disposed between said casing and said second rotor to reduce the flow of combustion gases therethrough; first and second counterrotating propellers driven by said first and second rotors, respectively, for producing substantially all thrust generated by said engine; and pitch control means for independently controlling the pitch of said first and second propellers.

25. A gas turbine engine for powering an aircraft at a cruise speed in excess of Mach 0.6 comprising:
 a gas generator effective for generating combustor gases; and
 means for efficiently transferring the energy of said gases into a net engine thrust, said means including:
  a. a counterrotating power turbine which is effective for receiving said combustion gases and extracting substantially all output power therefrom;
  b. counterrotating propeller blades directly coupled to and driven by said counterrotating power turbine to produce substantially all thrust generated by said engine; and
  c. pitch control means for controlling independently the pitch of said counterrotating propeller blades.

* * * * *